US012054357B2

(12) United States Patent
Malloy

(10) Patent No.: US 12,054,357 B2
(45) Date of Patent: Aug. 6, 2024

(54) ELEVATOR PAD ASSEMBLY

(71) Applicant: Leslie L. Malloy, La Canada, CA (US)

(72) Inventor: Leslie L. Malloy, La Canada, CA (US)

( * ) Notice: Subject to any disclaimer, the term of this patent is extended or adjusted under 35 U.S.C. 154(b) by 0 days.

(21) Appl. No.: 18/123,960

(22) Filed: Mar. 20, 2023

(65) Prior Publication Data

US 2023/0416051 A1 Dec. 28, 2023

Related U.S. Application Data

(63) Continuation of application No. 16/382,057, filed on Apr. 11, 2019, now Pat. No. 11,608,249.

(51) Int. Cl.
*B66B 11/02* (2006.01)

(52) U.S. Cl.
CPC ...... *B66B 11/0253* (2013.01); *B66B 11/0226* (2013.01)

(58) Field of Classification Search
CPC ........................ B66B 11/0253; B66B 11/0226
See application file for complete search history.

(56) References Cited

U.S. PATENT DOCUMENTS 1,933,030 A * 10/1933 Rosenmund ............. B65D 9/22 217/12 A
2,685,337 A * 8/1954 Swafford ............... A47H 5/032 160/126
3,681,158 A * 8/1972 Foggo .................... A47H 13/16 156/70
3,894,754 A * 7/1975 Staats .................... B42D 17/00 281/47
4,249,640 A * 2/1981 Darwent ............. B66B 11/0226 187/401
4,708,222 A * 11/1987 Bills ................... B66B 11/0226 187/401
4,924,973 A * 5/1990 Miller ................. B66B 11/0226 160/368.1
5,127,460 A * 7/1992 Abadi ....................... E06B 9/40 160/184
5,415,916 A * 5/1995 Giese ..................... A47H 13/16 428/347
5,544,387 A * 8/1996 Yamamoto ............. A47H 13/00 24/598.4
5,738,159 A * 4/1998 O'Brien ................. A47H 23/04 160/124
5,894,642 A * 4/1999 Eberhardt ................ A47K 3/38 160/124
6,192,965 B1 * 2/2001 Hinds ...................... A47K 3/38 160/DIG. 18

(Continued)

*Primary Examiner* — Michael A Riegelman
(74) *Attorney, Agent, or Firm* — John D. Carpenter

(57) ABSTRACT

An improved elevator pad assembly includes a plurality of closely spaced, flexible loops secured to the backside of a protective elevator pad, preferably within the upper margin near the top edge of the pad. In one embodiment, the loops are formed as part of a narrow mounting strip affixed to the back cover of the pad. Each loop lies hidden from view below the upper edge of the pad, and remains hidden from view even when fastened to a wall stud or other mounting hardware affixed to the elevator cab walls or ceiling. The flexible loops eliminate the need for grommets and make it easy to mount the pad assembly on elevator cab mounting hardware, allowing the elevator pad to be neatly positioned against the wall without bunching or sagging.

5 Claims, 7 Drawing Sheets

(56) References Cited

U.S. PATENT DOCUMENTS

| | | | | |
|---|---|---|---|---|
| 6,416,028 | B1 * | 7/2002 | Miller | B66B 11/0253 248/339 |
| 7,600,274 | B2 * | 10/2009 | Washington | A47K 3/38 160/124 |
| 7,909,082 | B2 * | 3/2011 | Peoples | A47H 2/00 160/DIG. 18 |
| 8,047,256 | B2 * | 11/2011 | Zimmer | A47H 13/14 160/124 |
| 8,286,310 | B1 * | 10/2012 | Negron | B66B 11/0226 24/304 |
| 8,468,767 | B1 * | 6/2013 | McBride | E04F 13/0803 52/471 |
| 9,144,340 | B2 * | 9/2015 | Mayer | A47H 1/00 |
| 9,499,930 | B2 * | 11/2016 | Miller | A47H 1/18 |
| 9,758,350 | B2 * | 9/2017 | Frisch | B66B 11/0226 |
| 10,392,228 | B2 * | 8/2019 | Miller | A47H 1/18 |
| 10,508,003 | B2 * | 12/2019 | Miller | A47H 1/18 |
| 11,608,249 | B1 * | 3/2023 | Malloy | B66B 11/0253 |
| 2006/0000013 | A1 * | 1/2006 | Peoples | A47K 3/281 4/558 |
| 2006/0005475 | A1 * | 1/2006 | Millar | B66B 11/0226 52/506.01 |
| 2007/0243784 | A1 * | 10/2007 | Shearrow | G09F 15/00 442/320 |
| 2012/0067531 | A1 * | 3/2012 | Ehrsam | H01F 7/0252 160/368.1 |
| 2014/0251551 | A1 * | 9/2014 | Chung | A47H 13/02 160/38 |
| 2014/0255639 | A1 * | 9/2014 | Miller | D06C 7/00 28/165 |
| 2014/0374037 | A1 * | 12/2014 | Varon | A47H 13/01 160/330 |
| 2017/0137262 | A1 * | 5/2017 | Miller | A47H 23/02 |
| 2017/0301424 | A1 * | 10/2017 | Thomas | A61B 6/107 |
| 2017/0355566 | A1 * | 12/2017 | Miller | A47H 1/18 |
| 2018/0179024 | A1 * | 6/2018 | Miller | B66B 11/0253 |
| 2018/0222723 | A1 * | 8/2018 | Gressien | B66B 5/0087 |
| 2020/0207585 | A1 * | 7/2020 | Gettling | B66B 11/0226 |
| 2020/0408232 | A1 * | 12/2020 | Nir | A47H 13/00 |

* cited by examiner

ELEVATOR PAD ASSEMBLY

CROSS-REFERENCE TO RELATED APPLICATION

This application is a continuation of U.S. patent application Ser. No. 16/382,057, filed Apr. 11, 2019, the entire content of which is incorporated herein by this reference.

FIELD OF THE INVENTION

The invention relates to protective pads used to protect the interior of elevator cabs, walls, and other surfaces.

BACKGROUND OF THE INVENTION

Elevators are used to carry passengers and freight from one floor to another in commercial high-rises, residences, factories, and other multi-story buildings and structures. Although the walls of some freight elevators are protected with diamond plate or other durable materials, a typical passenger elevator cab has decorative walls, which are more susceptible to dings and other damage caused by delivery men, movers, construction workers, and the like. It is common to protect elevator cab walls with padded cloth or vinyl elevator pads, which are mounted on studs extending from the upper walls, suspended from hooks clipped to the walls or ceiling, or secured to the walls or ceiling by other means. A common assembly includes a rectangular pad with grommets in the upper corners for securing the pad to wall studs, ceiling hooks, and/or other hardware.

FIG. 1 illustrates a pair of prior art elevator pads 12*a* and 12*b* installed in an elevator cab. The view is a perspective view showing one corner of the cab. Both pads are generally rectangular, though with rounded corners. The pad 12*a* on the left includes a cutout 13 to provide access to the elevator control panel, whereas the pad 12*a* on the right does not. Each pad is mounted to a wall of the cab by a plurality of spaced apart grommets 50 near the top edge of the pad, each grommet engaging with a corresponding wall stud fixed to the wall of the cab. The pads are quilted, with a diamond pattern of stitches that hold cotton batting or other fill material in place between front and back cloth or vinyl covers. The edges of the pads are protected with bias edge trim.

A limitation of prior art elevator pads is the fixed location of grommets, which may not be positioned to engage the hardware found in a particular elevator cab. FIG. 2 schematically illustrates a typical elevator cab and the common placement of protective pads within the cab. Five pads are installed: two pads 12*a* and 12*b* in the front of the cab, each with cutouts for elevator control panels; one pad 12*c* on the left wall; one pad 12*d* on the right wall; and one pad 12*e* on the back wall of the cab. Each pad has two or more grommets near the upper edge of the pad for attaching the pad to the wall. The pads have been made to size, with the location of the grommets corresponding to the precise location in the cab where mounting studs are located. Wall studs are typically installed at certain fixed locations in a given cab, which can vary from building to building. If an elevator pad has its grommets placed too far from, or near, the corners or middle top of the pad, it can be extremely difficult to mount the pad on the studs neatly and without undue bunching or stretching. In addition, a building engineer faced with the task of ordering a new or replacement elevator pad must accurately determine where the mounting studs or other hardware are or will be located, to ensure that the pads being purchased can be properly mounted.

There presently exists a need for an elevator pad having mounting means that enable the pad to be mounted readily to the walls or ceiling of an elevator cab, regardless of the precise location of the cab's mounting hardware.

SUMMARY OF THE INVENTION

An improved elevator pad assembly is provided and includes a plurality of flexible loops secured to the backside of a protective elevator pad, within an upper margin below the top edge of the pad. In one embodiment, the loops are connected to or integral with a narrow mounting strip, which is sewn or otherwise affixed to the backside of the pad within an upper margin of the pad. Each loop lies hidden from view below the top edge of the pad and can be attached to a wall stud or other mounting hardware secured to the elevator cab walls or ceiling in order to hang the pad against the wall. Even when the pad is secured to the mounting hardware, the loops lie below the top edge of the pad and cannot be seen from the front. The loops eliminate the need for grommets and make it easy to mount the pad to elevator cab mounting hardware, and, by remaining hidden, provide an aesthetically pleasing appearance. In another embodiment, the loops are formed from a continuous length of cord, webbing or other material, which is affixed directly to the backside of the pad, without a mounting strip. Alternatively, a plurality of discrete loops is provided, with each loop individually attached to the backside of the pad.

BRIEF DESCRIPTION OF THE DRAWINGS

Various features and advantages of the invention will be understood more completely when considered in connection with the accompanying drawings (which are not necessarily drawn to scale), wherein.

DETAILED DESCRIPTION OF PREFERRED EMBODIMENT

Figure 1:
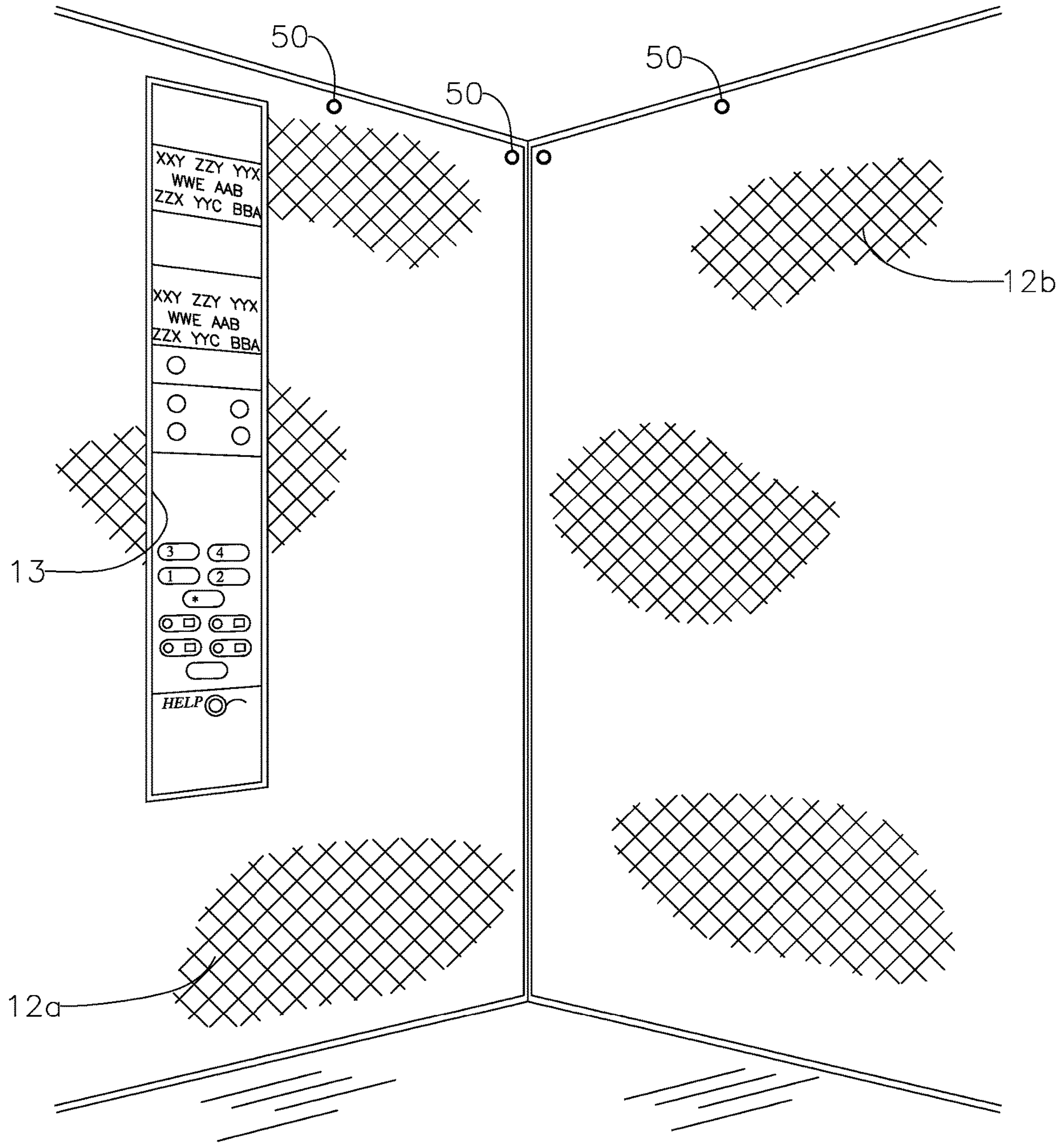
FIG. 1 PRIOR ART
FIG. 1 is a corner perspective view of two prior art elevator pads installed in an elevator.

FIGS. 3-6 illustrate an elevator pad assembly 10 having a protective pad 12 and a mounting strip 30 attached thereto. The pad assembly is generally rectangular in shape, with a top edge 14, bottom edge 16, side edges 18, and four corners 20*a*-20*d*, which may be square or rounded. The protective pad is quilted and includes a front cover or face 22 and a back cover or face 24, with the two covers being joined together at their edges by bias edge trim strips 26 (see FIG. 4). Cotton batting or other fill material is sandwiched between the two covers and provides a cushioning effect. The covers are made of cloth or vinyl fabric, or another soft, yet durable, material. The batting is held in place by quilted stitching through the two covers and the batting, which imparts a diamond, zig zag, or other patterned appearance to the pad.

A mounting strip 30 extends transversely across the entire width of the elevator pad and is attached to the back cover 24 of the pad, within an upper margin 23. The two ends of the mounting strip are tucked beneath the edge bias trim strips 26 along the left and right margins of the elevator pad back cover 24 (see FIG. 4). Alternatively, the mounting strip is attached after the trim strips are sewn in place, by placing the mounting strip across an already finished pad and securing it in place.

The mounting strip includes a base portion 32 and a plurality of closely spaced loops 34 extending therefrom. The base portion of the strip is affixed to the back cover of the pad with two or more rows of stitching or a strong adhesive. The mounting strip is attached to the back cover of the pad a sufficient distance below the top edge of the elevator pad such that the mounting strip base and the loops are hidden from view when the pad assembly is mounted to an elevator cab wall, even when a given loop is looped over and engages the mounting hardware. The loops generally have the same size and shape, and each loop has a proximal end 36 attached to or integral with the mounting strip base portion, and a distal end or edge 38 that extends away from the base portion. In FIGS. 3-6, the loops have a somewhat triangular shape. In alternate embodiments (described below), the loops have a non-triangular shape, such as semi-circular, tear drop, oval, "D"-shaped, "e"-shaped, etc. Unless otherwise indicated, the "shape" of the loop refers to the shape of a loop in its resting position, before the loop is hung from mounting hardware.

The mounting strip is made of a strong, woven material, for example flat or tubular synthetic webbing (e.g., Dyneema® webbing, Spectra® webbing), or even cotton webbing or strapping, or other materials known in the art. In the embodiment shown in FIGS. 7-8, the loops are formed of the same material comprising the mounting strip base. For example, a plurality of loops can be formed from a long swath of cordage or ribbon of material by configuring the loops and periodically stitching, fusing, or otherwise securing them into place along an elongate piece of webbing. In an alternate embodiment, the loops and the base portion of the mounting strip are formed of different materials. In general, it is preferred that the loops are non-rigid and flexible enough to be moved at least slightly from side to side, stretched slightly in the distal direction, or even elastic or floppy.

Referring again to FIG. 3, the mounting strip 30 extends substantially across the entire width of the pad 12, with 8-24 loops per foot, more preferably 10-15 loops per foot, most preferably 12-14 loops per foot. This makes it easy to select a loop for attachment to a wall stud, tension rod, ceiling hook, or other mounting hardware that may be used in an elevator cab—or a wall or other surface outside of an elevator cab—regardless of where the hardware is or will be located. For example, whether a given mounting stud, ceiling hook, etc. is located 1" from a corner, 3" from a corner, at the true midpoint of the wall, or at some other location along the wall of the cab, the mounting strip has an appropriately positioned loop available to engage the hardware and hang the pad on the wall without bunching or sagging.

Figure 4:
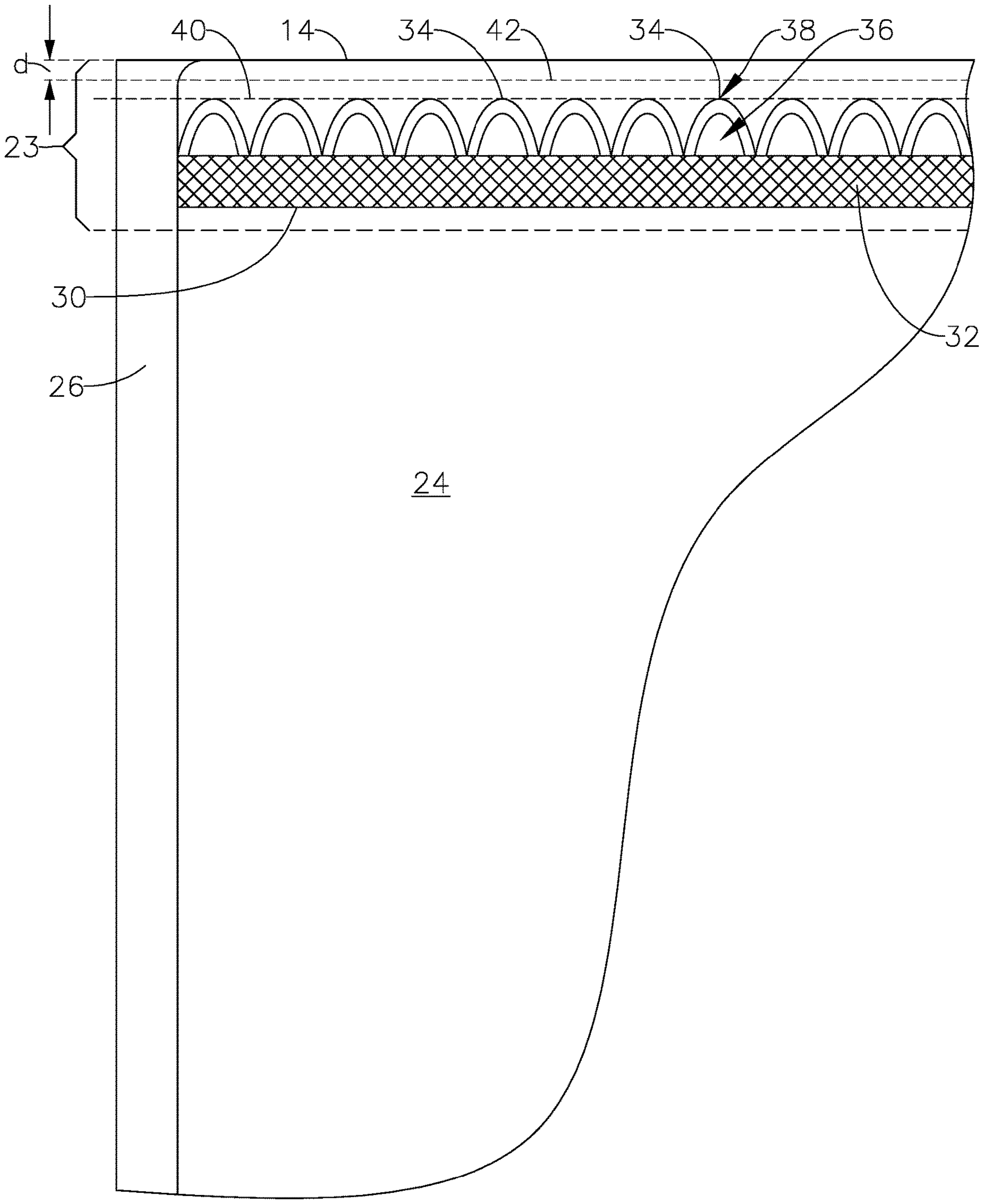
FIG. 4 is a fragmentary plan view of a portion of an elevator pad assembly according to an embodiment of the invention.

Referring now to FIG. 4, before the elevator pad is attached to mounting hardware in the elevator cab, the loops are in their natural resting position, and the loops' respective distal ends are aligned on or very near a first transverse line 40—an imaginary line extending transversely across the width of the pad, located below and generally parallel to the top edge of the pad. A second transverse line 42 is similarly defined by the point of normal extension of the loops' respective distal ends (e.g., the extension that results when a loop is looped over and hung from mounting hardware). The second transverse line 42 lies between the top edge 14 of the pad and the first transverse line 40, and is generally parallel to the top edge and the first transverse line. The second transverse line lies a sufficient (non-zero) distance "d" below the top edge of the pad so that no loop ever extends beyond the top edge of the pad, even when the loop(s) are at maximum extension caused by the weight of the pad.

Figure 5:
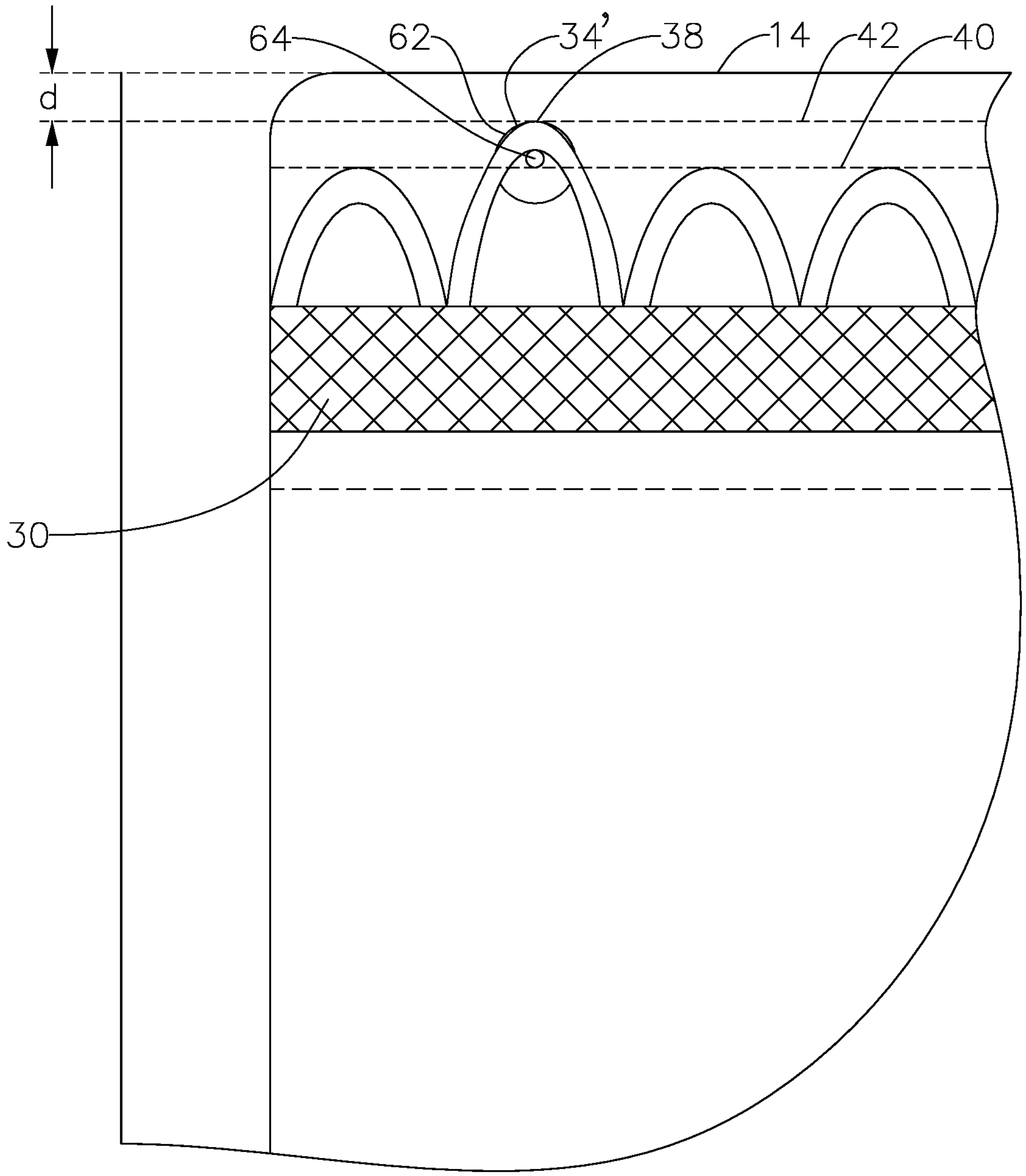
FIG. 5 is a close-up fragmentary plan view of a mounting strip used in one embodiment of the invention.
Figure 6:
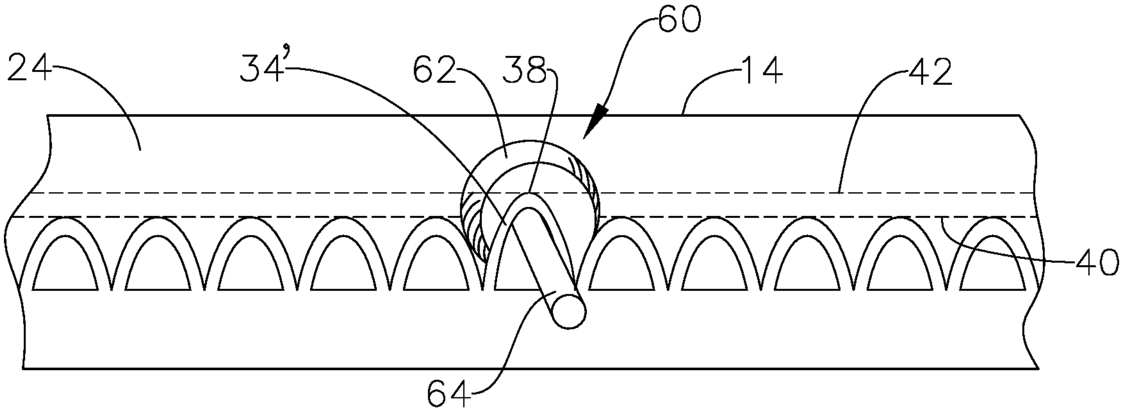
FIG. 6 is a close-up fragmentary perspective view of one embodiment of the invention, partially mounted on an elevator cab wall stud.

In FIGS. 5 and 6, one loop 34' is shown looped over a wall stud 60 of the sort typically employed as elevator pad mounting hardware. (The view is from the elevator cab wall, looking toward the back side of the elevator pad.) The wall stud includes a head 62 and a post 64, which extends into the wall. The loop 34' is suspended from the post, with the head of the wall stud sandwiched between the mounting strip 30 and the elevator pad back cover 24. The distal end 38 of the loop 34' extends no further than the second transverse line 42 (the line of normal extension). Thus, a non-zero distance "d" remains between the second transverse line 42 and the top edge 14 of the pad. A few loops adjacent to loop 34' may be pulled slightly upward-though not past the second transverse line—while the remaining loops remain at or substantially near the first transverse line 40 (the resting line), until another loop, further along the mounting strip, is pulled up and looped over a different wall stud, further along the pad. Thus, neither the loop nor the mounting hardware is visible when the pad is observed from the front.

Figure 7:
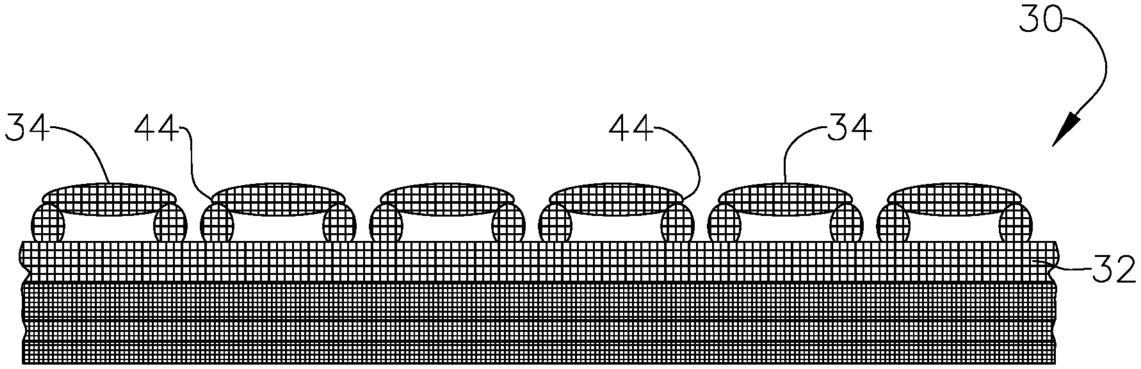
FIG. 7 is a schematic illustration of a mounting strip according to another embodiment of the invention.

An alternate embodiment of a mounting strip is shown in FIG. 7. The mounting strip 30 includes a base 32 and a plurality of D-shaped or oval loops 34. To reduce the profile of the loops and help the loops lie flat, a plurality of crimps 44 are formed in the loops. For mounting strips made of nylon fabric or similar synthetic material, such as Dyneema® or Spectra® webbing, this can be accomplished by applying heat and pressure to the loops at the desired locations. The mounting strip can be affixed to the back cover of an elevator pad with two or more rows of stitching or a strong adhesive.

Figure 8A:
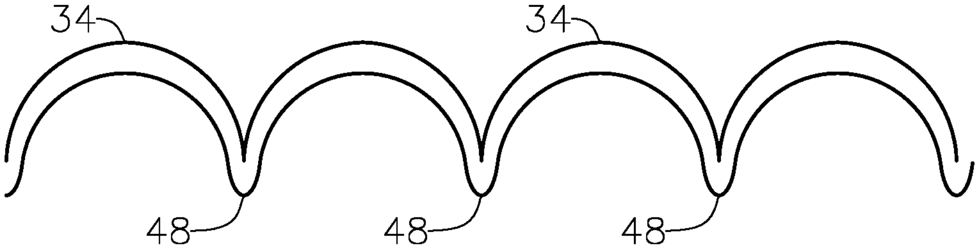
FIG. 8A is a schematic illustration of a configuration of cordage or webbing used in one embodiment of the invention.
Figure 8B:
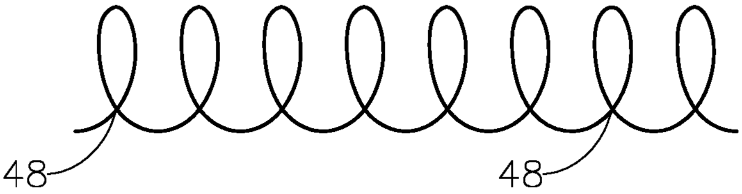
FIG. 8B is a schematic illustration of a configuration of cordage or webbing used in another embodiment of the invention.
Figure 8C:
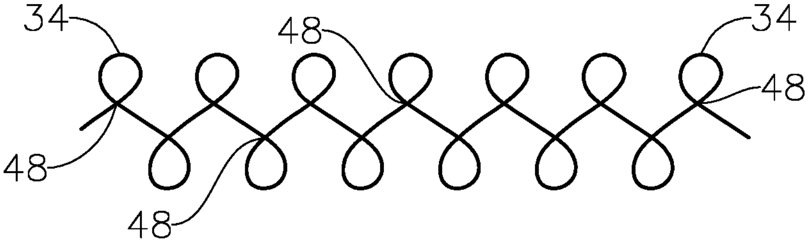
FIG. 8C is a schematic illustration of a configuration of cordage or webbing used in another embodiment of the invention.
Figure 8D:
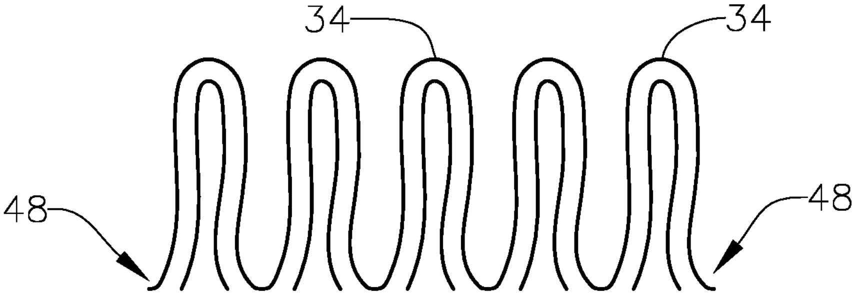
FIG. 8D is a schematic illustration of a configuration of cordage or webbing used in another embodiment of the invention.

In another embodiment of the invention, the base portion of the mounting strip is omitted, and a plurality of loops are attached directly to the back cover of the elevator pad, either as discrete loops or, more preferably, as a length of cordage, webbing, or other elongate material formed into a number of loops. FIGS. 8A-8D depict a number of nonlimiting examples. In FIG. 8A the loops are formed by tracing a generally cycloidal path with the cord or webbing and fastening the proximal ends 48 of each loop (defined by the cycloid's points of inflection) to the back cover, using two or more rows of stitching. In FIG. 8B the loops have an "e" shape; in FIG. 8C the loops have an "s" or figure-8 shape; and in FIG. 8D the loops are sinusoidal or elongated "e" shaped. In each case, the cordage, webbing, or other material is attached to the back cover of the pad with two or more rows of stitching, at or near a point of inflection 48.

A major advantage of the invention is the ease with which the elevator pad assembly can be mounted to an elevator cab wall, regardless of where the mounting hardware is or will be placed in the elevator cab. Referring again to FIG. 2, a typical elevator cab may have five protective elevator pads installed: two in the front of the cab, one on the left wall, one on the right wall, and one on the back wall of the cab. To hang a prior art pad, the grommets must be located at positions corresponding to the precise location in the cab where the mounting studs, ceiling hooks, or other hardware are or will be located. For example, to hang the right side pad 12*d* neatly and properly, its grommets 50*a*-50*e* must be lined up horizontally and spaced apart the proper distance to mate with the corresponding wall studs. In contrast, the present invention avoids the need for such precision, as one simply selects the appropriate loops from the mounting strip to align the pad into position with the mounting hardware. In general, owing to the flexibility of the loops, and the density of loop spacing (e.g., 8 to 24 loops per foot), it is easy to select loops that are properly positioned to mate with the mounting hardware found in the elevator cab, which results in the pad being hung in a tidy manner, with no bunching or sagging. Whether the elevator cab is equipped with wall studs, ceiling hooks, or other hardware, one simply locates the loops best positioned to mate with the hardware.

Figure 3:
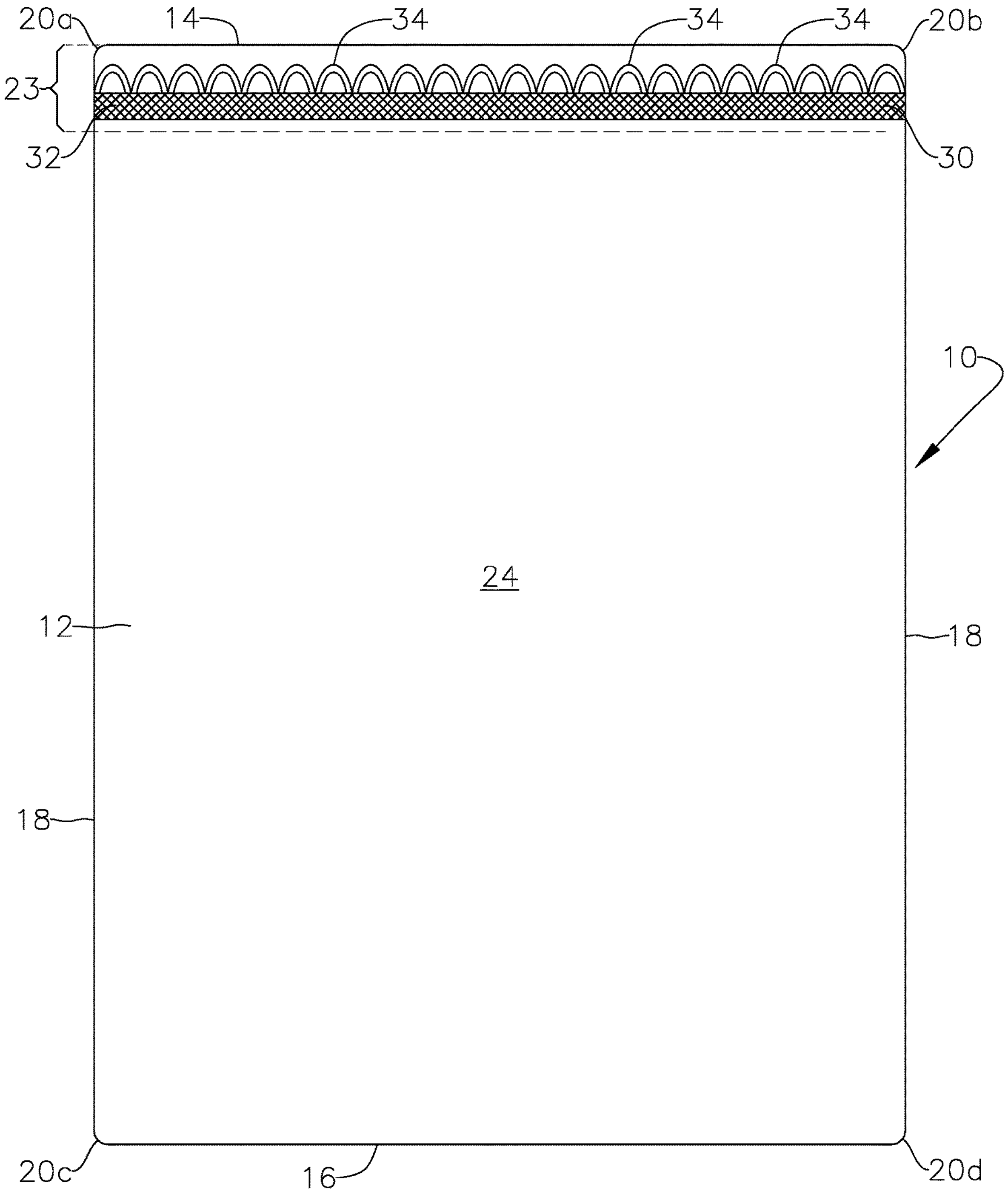
FIG. 3 is a back plan view of an elevator pad assembly according to one embodiment of the invention.

In an alternate embodiment of the invention, the mounting strip is affixed to the back cover of the elevator pad much nearer to the top edge of the pad, and the distal ends of the loops protrude over the edge and can be seen from the front. For example, a mounting strip having triangular shaped loops as shown in FIG. 3 can be sewn or adhered to the back cover of a pad, with the base portion very close to or even with the top edge of the pad, with the distal end of the loops extending above the top edge of the pad, both before and after being suspended from mounting hardware. The loops may have a triangular, semi-circular, tear drop, oval, "e," figure-8, or other shape. In another embodiment, the mounting strip is affixed sufficiently below the top edge that the distal end of each loop does not extend above the top edge unless and until that loop is pulled up and mounted on a wall stud, ceiling hook, or other hardware. In that case, the loop is only visible from the front—if at all, when it is suspended from the hardware.

Figure 2:
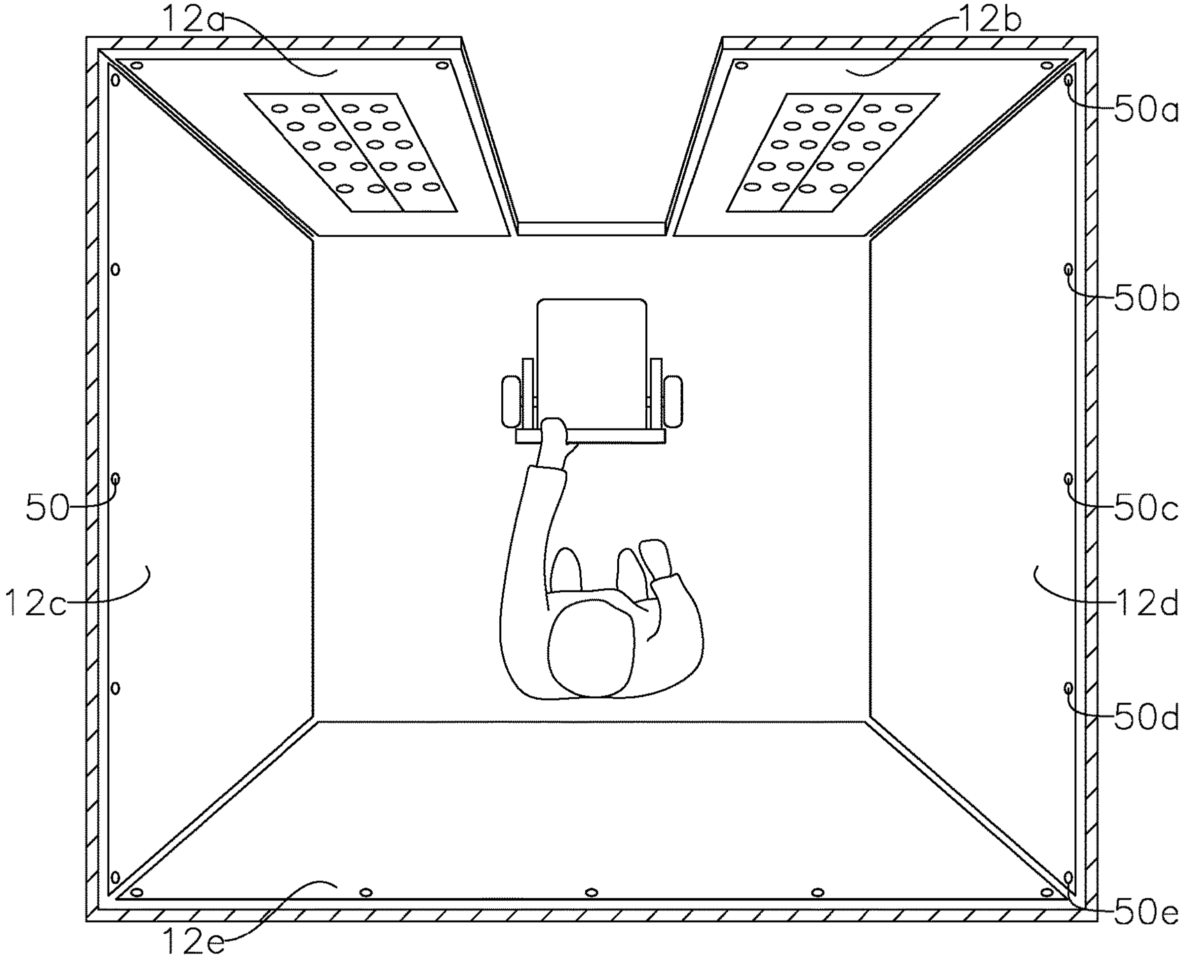
FIG. 2 PRIOR ART
FIG. 2 is a top perspective view of the interior of an elevator cab showing common positions for pad mounting hardware and grommets.

Additional embodiments and modifications can be made without departing from the invention, which is limited only by the appended claims and equivalents thereof. For example, the protective pad assembly described herein can be used to protect a wall, window, door, or other surface outside of an elevator cab. In that case, the "pad" is not necessarily an elevator pad, but has a substantially similar construction, with a mounting strip being affixed to the pad in the manner described herein. The improved pad assembly can then be suspended from hardware appropriate to the setting. As another example, instead of a single mounting strip affixed to the back cover across the entire width of the pad, 2-5 short lengths of mounting strips—or loops without a mounting strip—can be employed, with at least a first mounting strip located in the upper margin, in or near the upper left corner of the pad, and a second mounting strip located in the upper margin, in or near the upper right corner of the pad, and preferably 2-3 additional mounting strips mounted in the upper margin between the first and second mounting strips. A third mounting strip can be employed at or near the midpoint between the top two corners, or a third and a fourth mounting strip can be mounted between the first and the second mounting strips. These locations generally correspond to the locations along the walls of a typical elevator cab where elevator pad mounting hardware is most likely to be found, as shown in FIG. 2. A similar embodiment employs multiple sets of loops (which may be discrete or formed from continuous lengths of cordage or webbing) without a mounting strip, deployed as described.

What is claimed is:

1. An elevator pad assembly, comprising:

an elevator pad having a top edge, bottom edge, left edge, right edge, front cover, and back cover;

a narrow mounting strip sewn on to the back cover of the elevator pad within an upper margin thereof and extending across the elevator pad; and a plurality of mounting loops attached to or integral with the mounting strip;

wherein the mounting strip is positioned a sufficient distance below the top edge of the elevator pad so that none of the loops extend beyond the top edge of the elevator pad.

2. The elevator pad assembly of claim 1, wherein the loops are formed from cordage or webbing.

3. The elevator pad assembly of claim 1, wherein each loop is aligned to point toward the top edge of the elevator pad.

4. The elevator pad assembly of claim 1, wherein the mounting strip extends from the left edge to the right edge of the elevator pad.

5. The elevator pad assembly of claim 1, having 8-24 loops per foot of mounting strip.

* * * * *